United States Patent
Kunishi et al.

[15] 3,635,305
[45] Jan. 18, 1972

[54] HOUSING FOR ENCLOSING INSTRUMENTS AND THE LIKE TO BE MOUNTED ON FRONT INSTRUMENT PANEL OF COMPARTMENT OF AUTOMOBILE

[72] Inventors: Takeshi Kunishi; Yoshihiro Kawade, both of Kariya-shi; Koiti Yamakita; Ryozo Takaki, both of Aichi-ken; Katuhiro Yamanaka, Hekinan-shi, all of Japan

[73] Assignee: Nippondenso Kabushiki Kaisha, Kariya-shi, Aichi-ken, Japan

[22] Filed: Dec. 11, 1969

[21] Appl. No.: 884,271

[30] Foreign Application Priority Data

Dec. 17, 1968 Japan...................................43/92905

[52] U.S. Cl.............................180/90, 312/223, 317/99
[51] Int. Cl..........................................B60k 37/00
[58] Field of Search.......................180/90; 280/150 B; 98/2; 317/101, 99, 100, 312/7, 223

[56] References Cited

UNITED STATES PATENTS

| 3,270,831 | 9/1966 | Woofter et al.............................180/90 |
| 2,902,838 | 9/1959 | Nichols.........................................98/2 |
| 3,042,137 | 7/1962 | Mathues et al. ..........................180/90 |

FOREIGN PATENTS OR APPLICATIONS 830,463 2/1952 Germany................................180/90

Primary Examiner—Kenneth H. Betts
Attorney—Cushman, Darby & Cushman

[57] ABSTRACT

A housing for enclosing instruments, such as meters, gages, a radio, control units for an air-conditioning system, etc. and the like in the partitioned chambers integrally formed with the main body of the housing made of a synthetic resin. The housing further includes an air duct integrally formed therewith and made of a foamed synthetic resin so as to have a spongelike structure, and a plurality of electric conductors embedded in the walls of the main body for electrically connecting said instruments and the like with the exterior and with each other.

2 Claims, 5 Drawing Figures

PATENTED JAN 18 1972
3,635,305

INVENTORS
Takashi Kunishi
Yoshihiro Kawada
Koiti Yamakita
Ryozo Takaki
Katuhiro Yamanaka BY
Cushman, Darby & Cushman
ATTORNEYS

HOUSING FOR ENCLOSING INSTRUMENTS AND THE LIKE TO BE MOUNTED ON FRONT INSTRUMENT PANEL OF COMPARTMENT OF AUTOMOBILE

BACKGROUND OF THE INVENTION

The present invention relates to an instrument panel of an automobile and more particularly a housing for enclosing therein instruments, such as meters, gages, a radio, control units for an air-conditioning system, etc., and the like to be mounted on the front instrument panel of the compartment of an automobile, of the type in which said instruments and the like are housed in the partitioned chambers and the electrical connections of said instruments and the like with each other and the exterior can be effected.

On the instrument panel of an automobile are mounted a speed meter, a tachometer, a fuel gage, a radio, control units for an air-conditioning system, and other accessories such as cigarette lighter, a clock and so on all of which are required for the safeguarded operation of the automobile and for improving the maneuverablity and increasing the comforts and pleasure of driving. The above-described meters and so on are electrically connected with each other and with their corresponding instruments, machines, equipments and the like through lead wires or printed circuit boards. However, in case of the wiring by use of the lead wires, a relatively large space is required; the lead wires are entangled with each other, thus causing the misconnections; and they tend to be disconnected. In case of the wiring through the printed circuit boards, the cost of wiring becomes very expensive because of the special production methods of the printed circuit boards. Furthermore, the printed circuit boards are limited only to the platelike configuration so that the wiring design is limited.

Generally, the conventional instrument panel consists of a housing member for enclosing therein the meters, gages and the like, another housing for enclosing therein a radio, control units for an air-conditioning system, etc., and a glove box. These housings or chambers and the glove box are fabricated independently and then assembled into a unitary construction so that the number of fabrication and assembly steps is inevitably and disadvantageously increased. Furthermore, since the air duct for said air-conditioning system is extended through a very small space behind the instrument panel, the installation work thereof is very difficult.

SUMMARY OF THE INVENTION

Accordingly, one of the objects of the present invention is to provide a housing for enclosing therein the above-described instruments and the like having a plurality of integrally formed partitioned chambers and an integrally formed air duct, said housing being made of a synthetic resin, thereby reducing the number of fabrication and assembly steps and eliminating the air duct installation work and the assembly of the independent chambers and boxes.

Another object of the present invention is to provide a housing of the character described above having an integrally formed air duct which is made of a foamed synthetic resin so as to have a spongelike structure, thereby improving the thermal insulation between the interior of the housing and the air duct so as to prevent the adverse effects of the heated air flowing through the air duct upon the meters and the like and the chemical and electrolytic corrosions of these instruments and the like.

A further object of the present invention is to provide a housing of the type described above further including electric conductors embedded in the walls thereof in order to facilitate the electrical connections of the meters and the like with each other and with the exterior and prevent the faults due to the disconnection, etc. It must be noted that these embedded conductors also serve as the reinforcing members of the housing so that it becomes more rigid in construction.

The above and other objects, features and advantages of the present invention will become more apparent from the following description of one illustrative embodiment thereof with reference to the accompanying drawing.

DESCRIPTION OF THE PREFERRED EMBODIMENT

Figure 1:
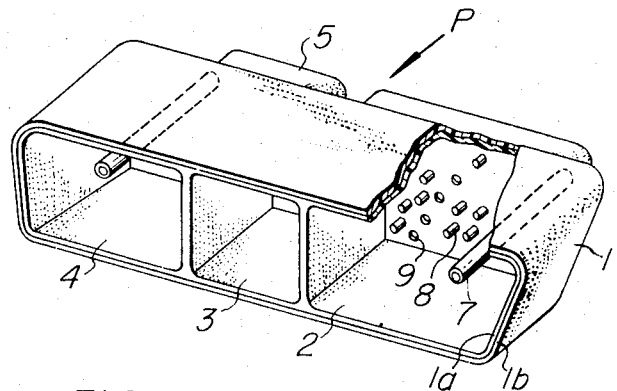
FIG. 1 is a perspective front view of a housing according to the present invention.
Figure 2:
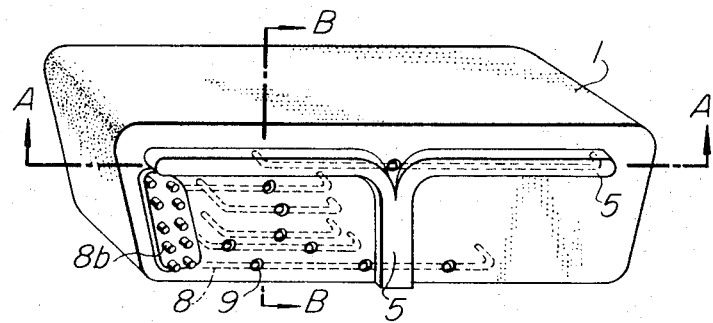
FIG. 2 is a rear view viewed in the direction indicated by the arrow P in FIG. 1.
Figure 3:
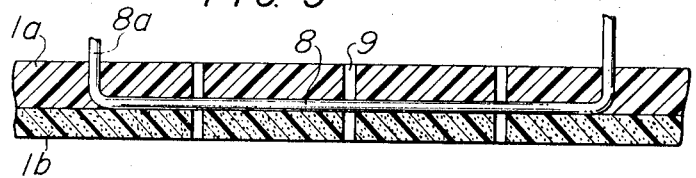
FIG. 3 is a sectional view taken along the line A—A of FIG. 2, illustrating especially the arrangement of the embedded electric conductors.

Referring to FIGS. 1 and 2, a box-shaped main body 1 has a chamber 2 for enclosing therein instruments such as a speed meter, a tachometer, a fuel gage, etc.; another chamber 3 for enclosing therein a radio, control units for an air-conditioning system, etc.; a glove box 4 and an air duct 5 integrally formed with the main body 1. The box-shaped main body consists of an inner layer 1a made of a thermoplastic or thermosetting resin suitable as a structural member when molded such as ABS-resin, polyacetal, phenolic resin, epoxy resin and an outer layer 1b made of foamed resin such as foamed vinyl chloride styrol, etc. The above two inner and outer layers 1a and 1b are injection molded as a unitary construction.

Figure 5:
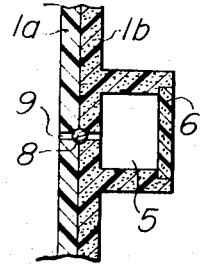
FIG. 5 is a sectional view taken along the line B—B of FIG. 2.

As shown in FIG. 5, the air duct 5 is of a sponge structure made of a foamed resin as in the case of the outer layer 1b. Reference numeral 6 designates a cover for the air duct 5 (see FIG. 5) and numeral 7 designates a discharge pipe (see FIG. 1).

In the walls of the chambers, especially the chambers 2 and 3 which enclose therein the meters and the like which requires electrical connections are provided with electric conductors 8 embedded therein for wiring in the vicinity of the boundary between the inner and outer layers 1a and 1b. The conductors 8 may be bare or insulated and may be of round, square or flat wires depending on their purpose.

Figure 4:
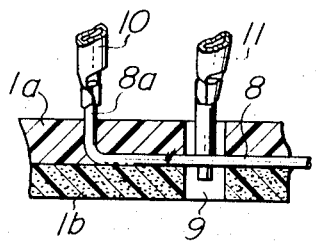
FIG. 4 is a fragmentary sectional view illustrating the connection between the embedded conductor and the terminals of a meter or the like enclosed in the housing.

By use of the embedded conductors 8, any circuit may be established in the body of the present invention. Insertion holes 9 are formed through the walls of the main body 1 so as to provide an access to the electric conductors 8 embedded. For electrical connections of the meters and the like, a terminal 10 thereof may be directly connected to the projection 8a extending out of the inner layer 1a and a terminal 11 may be inserted into the hole 8 for connection with the conductor 8, as shown in FIG. 4. The terminals 8b of the conductors 8 for connection with the exterior instruments, machines, equipments and the like are all collected at one specific portion of the back surface of the main body 1 so as to facilitate the electrical connections.

The heated or cooled air from an air-conditioning system is introduced into the duct 5 and then discharged through the pipe 7. Since the air duct 5 has the sponge-type structure as described above, the main body 1 is satisfactorily thermally insulated from the air duct 5 so that the meters and the like in the main body 1 may be well protected from being frosted and the electrical junctions may be prevented from the chemical and electrolytic corrosions.

Figure 6:
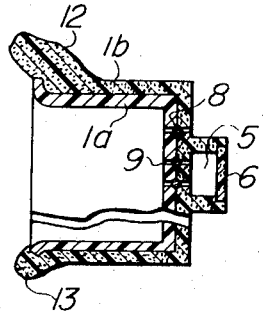
FIG. 6 is a sectional view of a variation taken along the line similar to the line B—B of FIG. 2.

When projected or expanded portions 12 and 13 having the sponge structure are formed at the front portions of the main body 1 as shown in FIG. 6, the impact caused by the collision of the automobile can be satisfactorily damped.

The present invention has been so far described in particular reference to the one illustrative embodiment thereof, but it will be understood that variations and modifications can be effected without departing the true spirit of the present invention as described hereinabove and as defined in the appended claims.

What is claimed is:

1. A housing for enclosing instruments such as meters, a radio, control units for an air-conditioning system, and the like to be mounted on a front instrument panel in the compartment of an automobile, comprising a box-shaped body made of a synthetic resin and having
 a plurality of chambers in which said instruments and the like are to be enclosed, and
 an air duct integrally molded with said box-shaped body for said air-condition system;
 said air duct being made of a foamed resin and having a spongelike structure.

2. A housing as set forth in claim 1 wherein electric conductors for wiring are embedded in the
 walls of said chambers enclosing the instruments and the like which require the electrical connections.

* * * * *